INVENTORS
RAYMOND D. ALABURDA
VINCENT H. WALDIN

BY

ATTORNEY

INVENTORS
RAYMOND D. ALABURDA,
VINCENT H. WALDIN 3,611,737
FREEZING OF FRAGILE FOODSTUFFS WITH
AN EBULLIENT LIQUID FREEZANT
Raymond D. Alaburda and Vincent H. Waldin, Wilmington, Del., assignors to E. I. du Pont de Nemours and Company, Wilmington, Del.
Filed Mar. 12, 1969, Ser. No. 806,599
Int. Cl. F25d 3/10
U.S. Cl. 62—63                          12 Claims

ABSTRACT OF THE DISCLOSURE

A process and apparatus for freezing fragile, generally flat, naturally occurring or prepared, food products by direct contact with an ebullient, liquid, polyfluorinated halohydrocarbon freezant having a normal atmospheric boiling point of about $-5°$ C. to $-50°$ C. and a vapor density at its boiling point at least about twice that of air at the same temperature, said freezing process including the steps of, and said freezing apparatus including means for, flooding or spraying the upper surfaces of individual pieces of the fragile food products with liquid freezant at low velocity as they are being transported by a foraminous conveyor to form a stable frozen crust on the upper surfaces, collecting the flooding or spraying freezant in a collecting means of suitable dimensions and positioned immediately below a portion of the conveyor which is in contact with the pieces, lifting the pieces from the conveyor and contacting the lower surfaces thereof with freezant by maintaining the level of freezant in the collecting means above the top surface of the conveyor, continuing the contacting of the lower surfaces of the pieces with freezant to form a stable frozen crust on the lower surfaces, and completing the freezing of the pieces by further direct contact with ebullient liquid freezant.

BACKGROUND OF THE INVENTION

(1) Field of the invention

This invention relates to an improved process and apparatus for freezing seafood and other fragile, generally flat, naturally occurring or prepared, food products by direct contact with an ebullient, liquid, polyfluorinated halohydrocarbon freezant.

(2) Description of the prior art

Alaburda et al. in U.S. Pat. 3,368,363, Feb. 13, 1968, disclose the freezing of individual food particles by immersion in ebullient, liquid, fluorine-containing, halogenated alkane, freezant media having a boiling point within the range of about $-5°$ C. to $-50°$ C. and a liquid density great enough at the boiling point to float food in a closed freezing vessel containing vapor locks through which the food is introduced and removed. In order to prevent loss of freezant vapor when the locks are open, Alaburda et al. suggest the use of a negative pressure within the freezing vessel; this may result in the introduction of some air with the food. The freezant vapor evolved during the freezing process and air and water vapor introduced with the food are continuously withdrawn from the freezing chamber, compressed and cooled, thereby condensing most of the water and freezant vapor. Condensed freezant is returned to the freezing chamber, while air and uncondensed freezant vapor are vented to the atmosphere. The food particles free-fall into a turbulent body of freezant liquid, are mechanically conveyed while afloat in the liquid until they are frozen, and are separated from the liquid for removal from the freezing vessel.

Waldin in U.S. Pat. 3,498,069, Mar. 3, 1970, discloses a method of extracting heat from articles, as in the freezing of individual food particles, by direct contact with an ebullient liquid freezant in an open vessel without significant loss of freezant vapor to the atmosphere, which method comprises maintaining by means of a suitable condenser a noncondensable gas-100% freezant vapor interface within the vessel below the level of all paths to the outside atmosphere and above the level at which the articles come in direct contact with the liquid freezant, and introducing the articles into and removing the articles from the vessel without substantially disturbing the noncondensable gas such as air above the interface or introducing essentially any noncondensable gas below the interface.

Many food products are too fragile to withstand the relatively rough handling of the inlet systems of most food freezers. It is customary to place the fragile food products carefully on a belt conveyor with no contact between the individual pieces until at least the surfaces have been frozen so that no damage or sticking to adjacent pieces will occur when the pieces are caused to come in contact with each other. Various metallic and non-metallic belts may be used and the belt may be foraminous or impervious to the freezing agent depending on the arrangements for contacting the food with the freezing agent. The food products which freeze to the belt may be scraped from the belt at a desired point or may break loose from the belt as it bends around a pulley. Food products also may be frozen onto the outside or inside surfaces of large diameter freezing drums and then scraped free.

The above types of operations are improved by using non-stick coatings for the freezing surfaces. However, practical difficulties often are experienced in scraping frozen food products from belts or drums. Surface disfigurements may make the appearance of the frozen food unacceptable. Moreover, if the crust-frozen food products remain on the freezing belt for a time to allow equilibration, the length of the freezer may become inordinately great.

Accordingly, there is need for an improved process for freezing fragile food products with an ebullient, liquid, polyfluorinated halohydrocarbon freezant. Further, there is need for achieving the aforesaid in a commercially feasible operation, at a reasonable cost and without excessive losses of freezant, preferably in a system open to the atmosphere.

SUMMARY OF THE INVENTION

The present invention resides in a continuous process, and an apparatus in which the process can be carried out, for freezing fragile, generally flat, naturally occurring or prepared, food products by direct contact with an ebullient, liquid, polyfluorinated, $C_1$ to $C_4$, saturated halohydrocarbon freezant having a normal atmospheric boiling point of about $-5°$ C. to $-50°$ C. and a vapor density at its boiling point at least about twice that of air at the same temperature. The process comprises:

(1) Positioning the fragile food products on a foraminous conveyor so that individual pieces are separated from each other;

(2) Flooding or spraying the upper surfaces of the pieces with liquid freezant at low velocity as they are transported by the conveyor to form a stable frozen crust on the upper surfaces;

(3) Collecting freezant from (2) in a collecting means positioned immediately below a portion of the conveyor which is in contact with the pieces;

(4) Lifting the pieces from the conveyor and contacting the lower surfaces thereof with freezant by maintaining the level of freezant in the collecting means above the top surface of the conveyor;

(5) Continuing the contacting of the lower surfaces of the pieces with freezant to form a stable frozen crust on the lower surfaces; and (6) Completing the freezing of the pieces by further direct contact with freezant.

The above process can be carried out in an apparatus suitably adapted for freezing food products by direct contact with an ebullient, liquid, polyfluorinated, $C_1$ to $C_4$, saturated halohydrocarbon freezant having a normal atmospheric boiling point of about $-5°$ C. to $-50°$ C. and a vapor density at its boiling point at least about twice that of air at the same temperature. The apparatus includes:

(1) Foraminous conveying means for transporting pieces of fragile, generally, flat, naturally occurring or prepared, food products;

(2) Means for spraying or flooding the upper surfaces of the pieces with liquid freezant at low velocity to provide a stable frozen crust on the surfaces;

(3) Means for collecting freezant from the spraying or flooding means, said collecting means being of suitable dimensions and suitably positioned relative to the conveyor that the collected freezant lifts the pieces from the conveyor and contacts the lower surfaces of the pieces to provide a stable frozen crust on the surfaces; and (4) Means for completing the freezing of the pieces by further direct contact with the freezant.

DESCRIPTION OF THE INVENTION

(1) The articles

Figure 2:
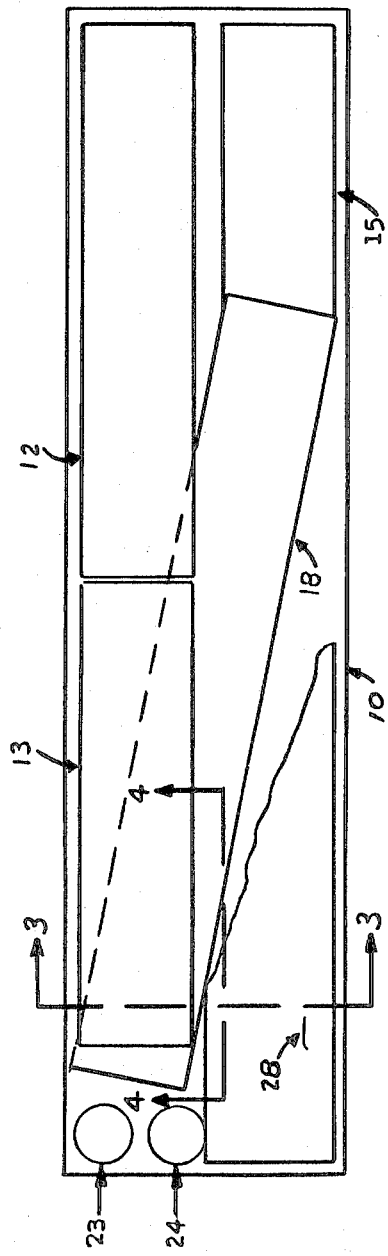
FIG. 2 is a partial schematic top view of the food freezing apparatus of FIG. 1.

In accordance with the freezing process and apparatus of this invention, any solid food product can be frozen to any desired extent. Because of the nature of the invention, the products most suitable for freezing are seafoods and other fragile, generally flat, naturally occurring or prepared, food products. These include: seafood products such as peeled and deveined shrimp, raw fish fillets, breaded and/or cooked shrimp, fish sticks, fish portions, fish steaks, scallops and oysters; meat products such as raw, cooked, battered and breaded or fried meat patties, solid muscle and red meats; and poultry products such as pieces and patties which can be raw, cooked, battered and breaded or fried.

(2) The freezants

The liquid freezants used in accordance with this invention extract heat from the food products by direct contact, thereby changing the physical state of the freezant from liquid to vapor. The freezants which are available for use in accordance with this invention are ebullient, liquid, polyfluorinated, $C_1$ to $C_4$ saturated halohydrocarbons. The term "polyfluorinated halohydrocarbon" is intended to include halogen-substituted hydrocarbons containing at least two fluorine atoms. Thus, the term includes hydrocarbons in which two or more of the hydrogens are substituted by halogen. The hydrocarbon may be an alkane or a cycloalkane.

The freezants used in accordance with this invention must have normal atmospheric boiling points, that is, boiling points at atmospheric pressure, between about $-5°$ C. and $-50°$ C. When using freezants boiling below about $-50°$ C. undesirable cracking of the food may result. Moreover, recovery of a freezant having a boiling point below about $-50°$ C. imposes the need for a refrigeration system more elaborate than those ordinarily used in conventional food freezing plants, thus adding to the freezing cost of such a system without any corresponding advantage. Preferably, the freezant has a normal boiling point between about $-20°$ C. and $-40°$ C. Because these freezants have normal boiling points below the temperature of both the food products being introduced and the ambient atmosphere, they are ebullient during use.

The freezants used in accordance with this invention must also have vapor densities at their normal boiling points at least about twice that of air at the same temperature. The process of this invention is predicated upon, and uses to advantage, the greater density of the freezant vapor as compared with air. Preferably, the freezant has a vapor density at its normal boiling point at least three times that of air at the same temperature.

Polyfluorinated, $C_1$ to $C_4$ saturated halohydrocarbons having the combination of boiling point and vapor density falling within the above-defined limits are listed in Table 1.

TABLE 1

| Freezants | Boiling point, °C. | Vapor-density at boil. pt./ air density at same temp. | Liquid density at boil. pt., g./cc. |
|---|---|---|---|
| Octafluorocyclobutane | −5.8 | 7.28 | 1.61 |
| 1,1-difluoroethane | −24.7 | 2.35 | 1.01 |
| Dichlorodifluoromethane | −29.8 | 4.36 | 1.49 |
| Chloropentafluoroethane | −38.7 | 5.55 | 1.55 |
| Chlorodifluoromethane | −40.8 | 3.10 | 1.41 |

The liquid densities of the freezants at their boiling points are also given in Table 1. As can be seen from the densities, the freezants, with the possible exception of 1,1-difluoroethane, are all more dense than food, which generally has a density of about $1.1 \pm 0.1$ g./cc. Accordingly, food will generally float on the surface of the freezant. The preferred freezant is dichlorodifluoromethane.

Mixtures of these compounds with themselves and with other compounds also provide suitable freezants so long as the mixture has a boiling point and a vapor density within the above-defined limits. Qualified mixtures provide a means of obtaining temperatures not obtainable with single component freezants. Azeotropic mixtures, that is, mixtures which yield vapors of the same composition as the liquid, are particularly suitable. The properties of useful azeotropic mixtures are given in Table 2.

TABLE 2

| Azeotropic freezant mixtures Components | Wt. percent | Boil. point, °C. | Vapor density at boil. pt./ air density at same temp. | Liquid density at boil. pt., g./cc. |
|---|---|---|---|---|
| Dichlorodifluoromethane<br>Chlorodifluoromethane | 25<br>75 | −41 | 3.28 | 1.44 |
| Chlorodifluoromethane<br>Chloropentafluoroethane | 49<br>51 | −46 | 3.89 | 1.50 |
| Dichlorodifluoromethane<br>1,1-difluoroethane | 74<br>26 | −33 | 3.59 | 1.3 |

Although freezant mixtures which are not azeotropic can also be used, they are more difficult to handle since the vapors lost to the atmosphere during operation of the system will have a higher concentration of the more volatile component than the liquid freezant mixture. In order to maintain the desired boiling point of the original liquid freezant in the freezing vessel when using such a freezant mixture, it is necessary that the make-up mixture have a higher concentration of the more volatile component than the original liquid freezant.

The second, third and fifth freezants in Table 1, in the gaseous state, form hydrates at temperatures between about 0° C. and 7° C. In the present invention hydrate formation substantially ceases when the frozen crust is formed on the food product since the surface temperature falls below 0° C. Hydrate formation is to be avoided since it appears on the food as an unattractive chalk-white deposit. During thawing of the frozen food an undesirable frothy appearance may result as the hydrate decomposes.

(3) Formation of frozen crust

The most important feature of the present invention is the rapid formation of a frozen crust on all the surfaces of the fragile food product being frozen. The thickness of the rapidly formed crust must be such that the food product no longer is fragile. Such a frozen crust of required thickness is referred to herein as a stable frozen crust. After formation of a stable frozen crust, the freezing process can be completed by prior art methods of freezing employing the ebullient liquid freezants previously described. Until the stable frozen crust is formed, the fragile food product must be handled with care. Destruction of the material can be avoided during the early stages of the freezing process through use of a foraminous conveying means such as a belt conveyor. The frozen crust is formed on the upper surfaces of the food product by flooding or spraying the product with liquid freezant as it is transported by the actuated conveyor. The spray or flood of liquid must be of low enough velocity that the fragile food product is not damaged. The present invention also provides for formation of a stable frozen crust on the lower surfaces of the food, for example, the food surface in contact with the top surface of the conveyor. This is accomplished by means of an appropriate collecting means or trough which retains the liquid freezant which is flooded or sprayed over the upper surfaces of the food. The container or trough or collecting means is of such dimensions and so positioned with respect to the foraminous conveyor that the depth of liquid freezant obtained is such that the liquid not only contacts the food on the conveyor but lifts the food off the conveyor surface. In this way the liquid freezant contacts the lower surfaces of the food, thus providing the frozen crust. Since the food is lifted off the conveyor surface at least until a crust is formed, the freezing of food to the conveyor is eliminated or at least minimized. The length of the trough or collecting means relative to the principal direction of food movement by the conveyor is selected so that the food product remains off the conveyor until a frozen crust of desired thickness is formed on the lower surfaces of the food. Naturally, the length also is coordinated with the speed at which the food is transported by the conveyor. The trough generally is positioned immediately below a portion of the conveyor which is in contact with the food products.

Although the above-described formation of stable frozen crust on fragile food products involves spraying or flooding of freezant from above and collection of freezant and flooding of the products from below, the crust can be formed without a separate collecting means. A spray or flood of liquid can be directed against the underside of the foraminous conveyor on which the food products are being transported. If the openings of the conveyor are suitably sized and positioned, sufficient liquid freezant passes through and is retained by the upper side of the conveyor so that, especially when combined with the liquid being sprayed or flooded from above, essentially the same result can be obtained as through use of a separate collecting means for collecting the spray or flood of liquid from above.

(4) Preferred embodiments

The process and apparatus of the present invention for providing a stable frozen crust on the surfaces of fragile food products are preferably used in conjunction with the freezing process and apparatus disclosed in the aforesaid U.S. Pat. 3,498,069 modified only as necessary to include the requisites of the present invention. The aforesaid application which relates broadly to the extraction of heat from articles discloses a process which comprises:

(A) Maintaining an ebullient, liquid, polyfluorinated, $C_1$ to $C_4$, saturated halohydrocarbon freezant in the heat extraction zone of an open heat extraction vessel, said freezant having a normal boiling point between 5° C. and −50° C. and a vapor density at its normal boiling point at least twice that of air at the same temperature;

(B) Maintaining a noncondensable gas-100% freezant vapor interface in the heat extraction vessel by means of a vapor condenser in the heat extraction zone operating at a temperature below the normal boiling point of the liquid freezant, the level of the interface being below the level of all paths to the outside atmosphere which are in free vapor communication with the heat extraction zone, and the level of the interface in the heat extraction zone being above the level at which the articles come in direct contact with the liquid freezant, (C) Introducing articles selected from the group consisting of liquids and solids which are at a temperature above the normal boiling point of the liquid freezant into the heat extraction zone without substantially disturbing the noncondensable gas above the interface and without introducing essentially any noncondensable gas below the interface, (D) Passing the articles through the heat extraction zone, (E) Extracting heat from the articles in the heat extraction zone by direct contact with the liquid freezant, and (F) Removing the articles from the vessel through an exit opening without substantially disturbing the noncondensable gas above the interface and without introducing essentially any noncondensable gas below the interface.

The direct contacting with liquid freezant (Section E) can be an intermittent or interrupted contacting.

The heat extraction vessel disclosed in said application comprises:

(A) An open vessel, (B) A heat extraction zone within the vessel and containing liquid freezant having a normal atmospheric boiling point less than ambient temperature, (C) Vapor condensing means in the heat extraction zone, the top of the vapor condensing means being below the level of all paths to the outside of the apparatus which are in free vapor communication with the heat extraction zone and the size of the vapor condensing means being such as to condense substantially all freezant vaporized in the heat extraction zone, (D) Means for introducing articles into the heat extraction zone, (E) Means for conveying the articles through the heat extraction zone, (F) Means within the heat extraction zone for causing the articles to come in direct contact with the liquid freezant, thereby generating freezant vapor, substantially all of which is condensed by the vapor condensing means, (G) An exit opening for removing the articles from the vessel, and (H) Means for conveying articles from the heat extraction zone through the exit opening and out of the vessel.

The means for providing direct contacting with liquid freezant (Section F) can be means which provide intermittent or interrupted contacting.

DETAILED DESCRIPTION OF THE DRAWINGS

Figure 1:
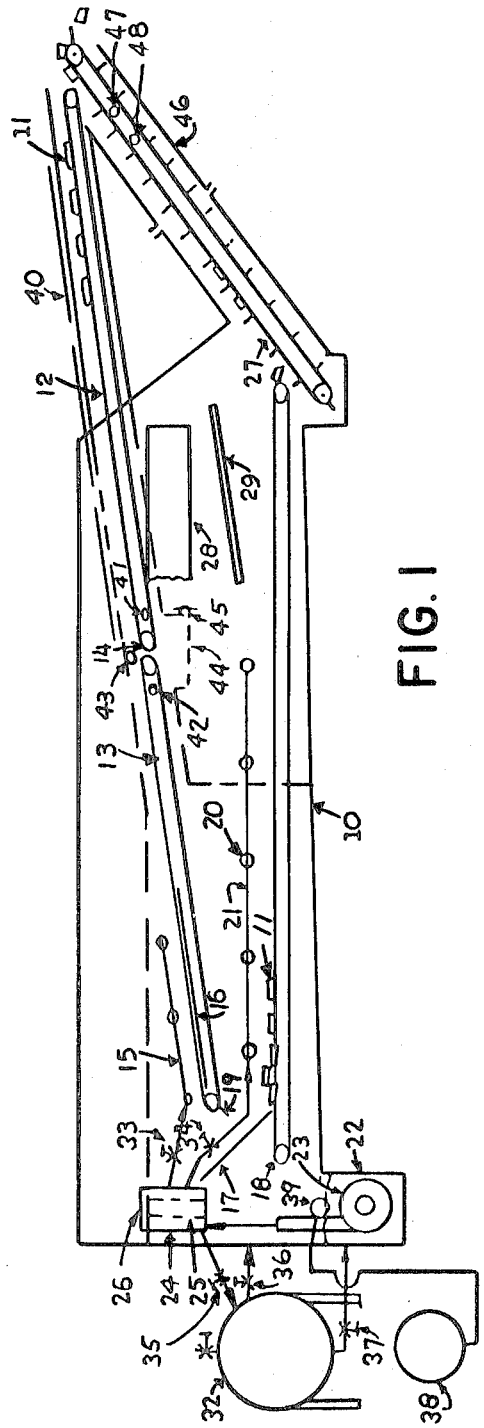
FIG. 1 is a schematic elevation of a preferred food freezing apparatus employing the concepts of the present invention.

FIGS. 1–4 disclose specific embodiments of the process of this invention. Shown in FIG. 1 is the preferred food freezing apparatus which comprises open-topped, insulated, food freezing vessel 10 within which food products carried on belt conveyors are contacted with an ebullient, liquid, polyfluorinated halohydrocarbon freezant until they are partially or completely frozen. The system is operated with an air-100% freezant vapor interface as disclosed in the aforesaid U.S. Pat. 3,498,069. The interface is the highest level in the freezing vessel at which 100% freezant vapor is detectable and the lowest level at which the presence of air is detectable. Fragile, generally flat, food products 11 are loaded on variable speed, stainless steel, wire mesh, belt inlet conveyor 12 so that no individual piece is in contact with any other piece. The food is carried downwardly and transferred to set-freeze conveyor 13 which also is a variable speed, stainless steel, wire mesh belt. The diameters of the rollers for inlet conveyor 12 and set-freeze conveyor 13 are small at transfer point 14 to minimize damage to the food products. The level of the air-100% freezant vapor interface during normal operation of the freezer is approximately at point 14.

Figure 4:
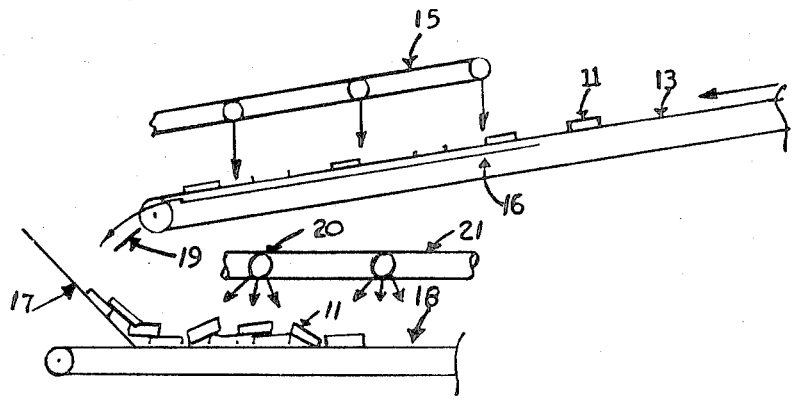
FIG. 4 is a partial schematic elevation of the food freezing apparatus of FIGS. 1 and 2 taken along the line 4—4 of FIG. 2.
Figure 3:
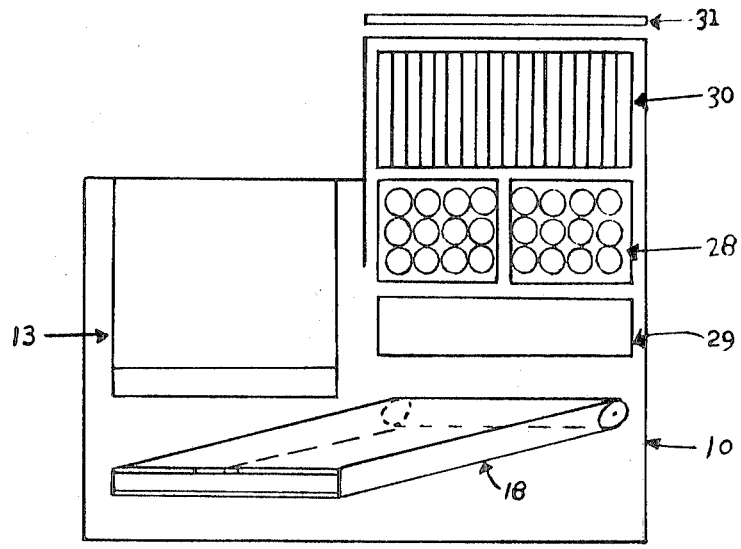
FIG. 3 is a partial schematic elevation of the food freezing apparatus of FIGS. 1 and 2 taken along the line 3—3 of FIG. 2.
Figure 5:
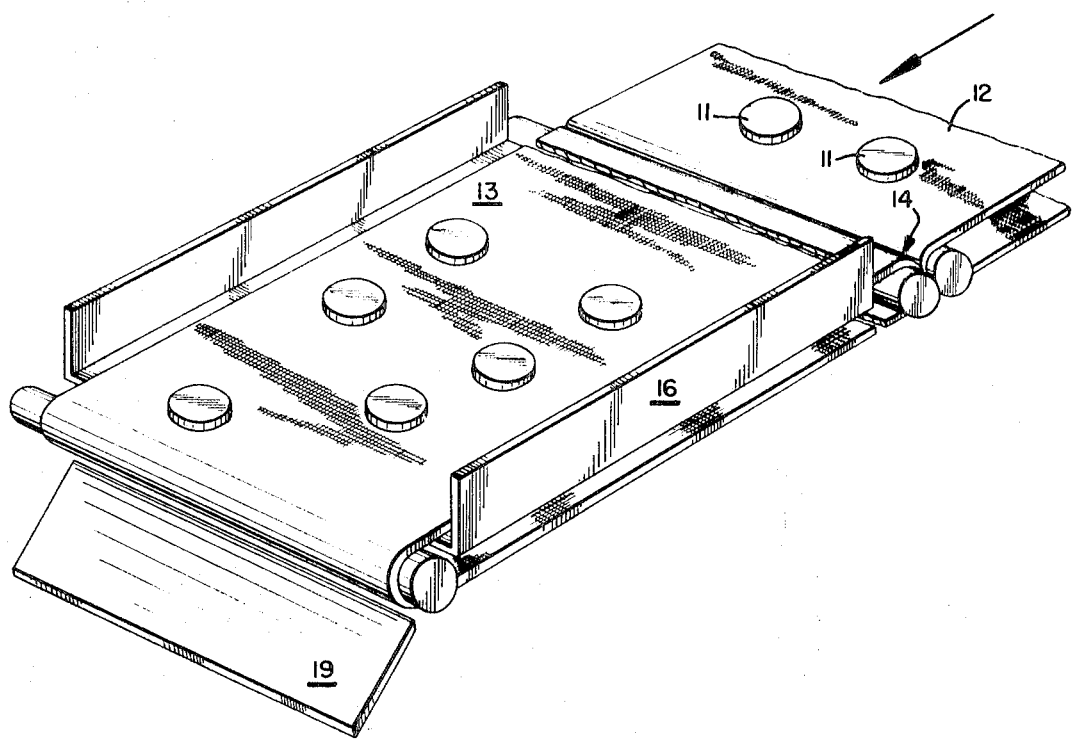
FIG. 5 is a partial perspective view of the food freezing apparatus of FIG. 4 showing in greater detail the open-ended trough 16.
Figure 6:
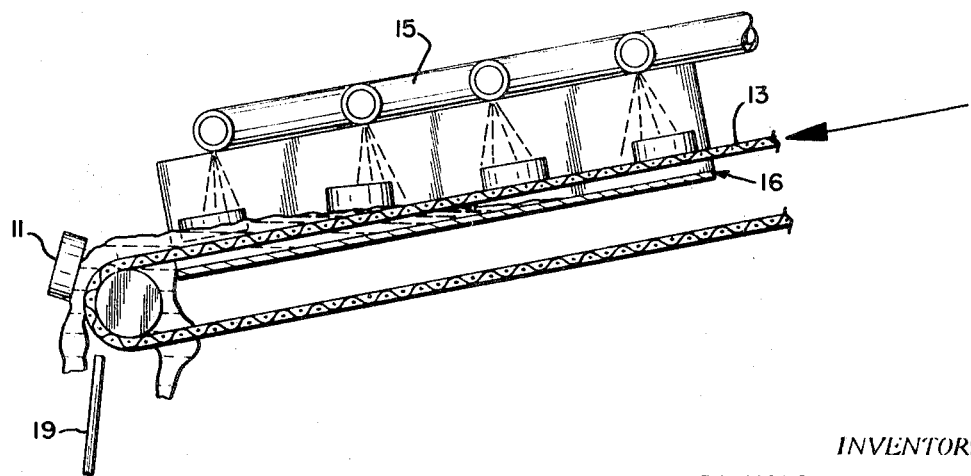
FIG. 6 is a partial schematic elevation of the food freezing apparatus of FIG. 4 showing in greater detail the open-ended trough 16 and the flotation of food products 11.

Initial contacting of the food with liquid freezant occurs beneath pipe manifold system 15 (shown in more detail in FIGS. 4 and 6). Branches of the manifold system extending at right angles to the direction of conveyor movement have numerous, closely-spaced large holes at the bottom to release a gentle flood of liquid freezant onto the fragile food products on the upper run of wire mesh set-freeze conveyor 13. Open-ended trough 16 is provided beneath the upper run of the conveyor to collect liquid freezant which then contacts the lower surfaces of the food products as they travel downward along the trough with the flood of liquid freezant. The food is lifted off the conveyor as it passes over the trough.

The flat, fragile food products are frozen to a stable crust on all surfaces almost instantaneously and retain their shapes without pressure plates or other artificial restraints. After the food products are crust frozen to sufficient depth, they leave conveyor 13 with the liquid freezant and are guided by food deflector 17 onto freeze conveyor 18. This conveyor also is a variable speed, stainless steel, wire mesh belt similar to conveyors 12 and 13 but of heavier construction because it can be loaded more heavily than the others. Increased loading of conveyor 18 can be effected by decreasing its running speed. Any food pieces which occasionally adhere to conveyor 13 are dislodged by scraper 19 which slightly clears the moving belt.

As the crust frozen food products pile up on freeze conveyor 18 at the base of deflector 17, liquid freezant drains through the conveyor. For those foods which have a tendency to crack, a period of vapor contact can be provided to allow the icy crust to cold-flow and relieve internal stresses, thus preventing cracking of the food when freezing is completed. If the food product can be frozen satisfactorily by continuous contact with liquid freezant, no period of vapor contact need be provided and high velocity, non-fouling, freezant spray nozzles 20 can be located on pipe manifold 21 to flood the food on conveyor 18 from deflector 17 along the conveyor for whatever distance is required to remove the desired amount of heat.

Liquid freezant drains from the food on conveyor 18 to freezant sump 22 from which recirculating pump 23 delivers it to filter 24. Large food fines, frost, hydrate and other debris are removed from the liquid freezant by coarse filter element 25 which can be removed for cleaning by removing lid 26 which is accessible from the exterior of the freezer.

The freeze conveyor 18 tumbles the frozen food products to dislodge liquid freezant from recesses as it delivers the food to exit conveyor 27 which is similar to freeze conveyor 18 but has flights to enable it to raise the food to the level of the inlet in a short distance. As the frozen food is carried by exit conveyor 27 above the air-100% freezant vapor interface level, heavy freezant vapor drains out of the interstices of the food and is replaced by air. Freeze conveyor 18 is set at an angle across the lower portion of the freezing chamber to permit exit conveyor 27 to deliver the frozen food products adjacent to the inlet and at the same level. The angle of 18 is apparent in FIG. 2. The freezing apparatus is thus of counterflow rather than straight through design although the above-described operating principles can be employed in a straight-through design freezing apparatus.

Freezant vapor evolved from set-freeze conveyor 13, freeze conveyor 18, the food products, and elsewhere in the apparatus is condensed by parallel-finned tube-bundle condenser 28 such as is employed as the evaporator in a standard refrigeration system. A suitable condenser also is described in the aforesaid U.S. Patent 3,498,069. The condenser is divided into two sections, either of which sections can be heated by hot gas for removing ice, frost or hydrate from the condensing surfaces while the other section continues to function as a condenser. The condenser sections are more clearly seen in FIG. 3. Freezant liquid from the condenser is returned to sump 22 along with that flooded over the food on freeze conveyor 18. Condensate deflector 29 prevents freezant from the condenser, possibly containing removed hydrate deposits, from contacting the frozen food after it leaves the region under spray 20.

Referring again to FIG. 3, a quiescent zone is maintained above condenser 28 by the open vertical passages of a phenolic resin-impregnated, honeycomb structure 30 to minimize the loss of freezant vapor from the space above the condenser by retarding thermal convection and ambient air currents in this area. Impervious dust cover 31, located above the top of honeycomb structure 30 is provided to reduce entry of air-borne dirt; it should not restrict breathing through the honeycomb passages.

During temporary shutdowns freezant liquid can be pumped by circulating pump 23 through filter 24 into storage tank 32 for recovery. Coarse filter element 25 can be replaced by a fine element to minimize the accumulation of debris in the storage tank. Valves 33 and 34 are closed and valve 35 is open during the recovery cycle. Freezant can be returned from the storage tank as a vapor through valve 36 or as a liquid through valve 37. Make-up freezant can be supplied from standard shipping cylinder or bulk storage tank 38 through float control valve 39.

All parts of the freezing apparatus which come in contact with the food are made of materials capable of being cleaned by methods normally used for cleaning food handling equipment. Vapor sealed access covers 40 are located above inlet conveyor 12 for cleaning purposes. During idling periods the air-100% freezant vapor interface level drops below transfer area 14 and the inlet conveyor can be exposed without loss of freezant vapor. Water or steam spray manifolds 41 and 42 are provided to clean the inlet and set-freeze conveyor belts 12 and 13. Air manifold 43 is provided to dry both belts as they pass over the small diameter rollers at transfer point 14. Sump 44 and drain 45 are provided for removal of water and cleaning agents.

Removable, vapor sealed, access cover 46 is provided for exit conveyor 27 to expose it above the interface level for cleaning during idling periods. Water or steam manifold 47 and air manifold 48 are provided to clean and dry exit conveyor 27.

The following example, illustrating the process and apparatus of this invention, is given without any intention that the invention be limited thereto.

EXAMPLE

A freezing apparatus similar to that described above relative to FIGS. 1–4 was used to freeze breaded round and fantail shrimp, chicken portions, and meat patties using dichlorodifluoromethane as the freezant. The conveyor belts were 30 inches (76.2 cm.) wide and there was no interim vapor contact between the periods of liquid contact on set-freeze conveyor 13 and freeze conveyor 18. The frozen food was attractive in appearance and ready for storage or packaging. At the average freezing rate of 1500 lb. (680.4 kg.) per hour the loss of freezant was about 2 lb. per 100 lb. of food frozen.

The embodiments of the invention in which an exclusive property or privilege is claimed are defined as follows:

1. In a continuous process for freezing food products by direct contact with an ebullient, liquid, polyfluorinated, $C_1$ to $C_4$, saturated halohydrocarbon freezant having a normal atmospheric boiling point of about $-5°$ C. to $-50°$ C. and a vapor density at its boiling point at least about twice that of air at the same temperature, the improvement which comprises:
   (1) positioning fragile, naturally occurring or prepared, food products on a foraminous conveyor so that individual pieces are separated from each other;
   (2) flooding or spraying the upper surfaces of the pieces with liquid freezant at low velocity as they are transported by the conveyor to form a stable frozen crust on the upper surfaces;
   (3) collecting freezant from (2) in a collecting means positioned immediately below a portion of the conveyor which is in contact with the pieces;
   (4) lifting the pieces from the conveyor and contacting the lower surfaces thereof with freezant by maintaining the level of freezant in the collecting means above the top surface of the conveyor;
   (5) continuing the contacting of the lower surfaces of the pieces with freezant to form a stable frozen crust on the lower surfaces; and
   (6) completing the freezing of the pieces by further direct contact with freezant.

2. The process of claim 1 wherein the freezant is dichlorodifluoromethane.

3. The process of claim 1 wherein the completion of freezing is carried out by an interrupted freezing technique.

4. The process of claim 1 carried in an open freezing vessel while maintaining a noncondensable gas-100% freezant vapor interface in the vessel by means of a condenser operating at a temperature below the normal boiling point of the freezant, the level of the interface being below the level of all direct vapor paths to the outside atmosphere but above the level at which the pieces come in direct contact with the liquid freezant.

5. In a continuous process for freezing food products by direct contact with an ebullient, liquid, polyfluorinated, $C_1$ to $C_4$, saturated halohydrocarbon freezant having a normal atmospheric boiling point of about $-5°$ C. to $-50°$ C. and a vapor density at its boiling point at least about twice that of air at the same temperature, the improvement which comprises:
   (1) positioning fragile, naturally occurring or prepared, food porducts on a foraminous conveyor so that individual pieces are separated from each other;
   (2) flooding or spraying the upper surfaces of the pieces with liquid freezant at low velocity as they are transported by the conveyor to form a stable frozen crust on the upper surfaces;
   (3) flooding or spraying the underside of the conveyor with liquid freezant so that at least a portion thereof flows through the openings to the top side of the conveyor;
   (4) collecting sufficient liquid freezant from (3) and (2) on the conveyor to lift the pieces from the conveyor and contacting the lower surfaces of the pieces with the liquid to form a stable frozen crust on the lower surfaces; and
   (5) completing the freezing of the pieces by further direct contact with freezant.

6. The process of claim 5 wherein the freezant is dichlorodifluoromethane.

7. The process of claim 5 wherein the completion of freezing is carried out by an interrupted freezing technique.

8. In an apparatus suitably adapted for freezing food products by direct contact with an ebullient, liquid, polyfluorinated, $C_1$ to $C_4$, saturated halohydrocarbon freezant having a normal atmospheric boiling point of about $-5°$ C. to $-50°$ C. and a vapor density at its boiling point at least about twice that of air at the same temperature, the improvement which comprises:
   (1) foraminous conveying means for transporting pieces of fragile, naturally occurring or prepared, food products;
   (2) means for spraying or flooding the upper surfaces of the pieces with liquid freezant at low velocity to provide a stable frozen crust on the surfaces;
   (3) means for collecting freezant from the spraying or flooding means, said collecting means being of suitable dimensions and suitably positioned relative to the conveyor that the collected freezant lifts the pieces from the conveyor and contacts the lower surfaces of the pieces to provide a stable frozen crust on the surfaces; and
   (4) means for completing the freezing of the pieces by further direct contact with freezant.

9. The apparatus of claim 8 wherein the means for completing the freezing provides interrupted direct contact with freezant.

10. The apparatus of claim 8 which includes an open freezing vessel and a vapor condensing means, the top of the vapor condensing means being below the level of all direct vapor paths to the outside atmosphere and the size of the vapor condensing means being such as to condense substantially all freezant vaporized in the vessel.

11. In an apparatus suitably adapted for freezing food products by direct contact with an ebullient, liquid, polyfluorinated, $C_1$ to $C_4$, saturated halohydrocarbon freezant having a normal atmospheric boiling point of about $-5°$ C. to $-50°$ C. and a vapor density at its boiling point at least about twice that of air at the same temperature, the improvement which comprises:
   (1) foraminous conveying means for transporting pieces of fragile, naturally occurring or prepared, food products;
   (2) means for spraying or flooding the upper surfaces with liquid freezant at low velocity to provide a stable frozen crust on the surfaces;
   (3) means for spraying or flooding the underside of the conveyor with liquid freezant so that at least a portion of liquid passes through the openings, collects on the top side of the conveyor and, along with any liquid collected from (2), lifts the pieces from the conveyor, thereby contacting the lower surfaces of the pieces to provide a stable frozen crust on the surfaces; and
   (4) means for completing the freezing of the pieces by further direct contact with freezant.

12. The apparatus of claim 11 wherein the means for completing the freezing provides interrupted direct contact with freezant.

References Cited

UNITED STATES PATENTS

| | | | |
|---|---|---|---|
| 3,298,188 | 1/1967 | Webster et al. | 62—64 X |
| 2,332,367 | 10/1943 | Birdeye | 62—64 X |
| 2,920,462 | 1/1960 | Roser et al. | 62—63 X |
| 3,368,363 | 2/1968 | Alaburda et al. | 62—64 |
| 3,405,531 | 10/1968 | Davis, Jr. et al. | 62—63 |
| 3,413,818 | 12/1968 | Pelmulder | 62—63 |

WILLIAM E. WAYNER, Primary Examiner

U.S. Cl. X.R.

62—374